United States Patent [19]

Neale

[11] 3,960,194
[45] June 1, 1976

[54] BALANCED THREE-PLY BIAS TIRE

[75] Inventor: Patrick S. Neale, Mogadore, Ohio

[73] Assignee: The Goodyear Tire & Rubber Company, Akron, Ohio

[22] Filed: June 30, 1975

[21] Appl. No.: 591,373

[52] U.S. Cl. .............................. 152/355; 152/357 R
[51] Int. Cl.² ............................................. B60C 9/10
[58] Field of Search ........... 152/354, 355, 356, 357, 152/359, 361 R

[56] References Cited
UNITED STATES PATENTS

| | | | |
|---|---|---|---|
| 1,364,870 | 1/1921 | Ehle | 152/355 |
| 2,317,912 | 4/1943 | Howe | 152/356 |
| 3,300,352 | 1/1967 | Williams | 152/356 |
| 3,672,423 | 6/1972 | Duduk | 152/356 |
| 3,682,217 | 8/1972 | Marzocchi | 152/356 |
| 3,709,277 | 1/1973 | Montagne | 152/355 |
| 3,774,663 | 11/1973 | Montagne | 152/354 |

Primary Examiner—Drayton E. Hoffman
Attorney, Agent, or Firm—F. W. Brunner; M. L. Gill

[57] ABSTRACT

A pneumatic tire having three plies of continuous tire cord fabric extending at successively alternating bias angles with respect to the centerplane and from bead to bead with one ply having extra high denier cords and being sandwiched between the other two plies which have normal denier cords.

The foregoing abstract is not to be taken as limiting the invention of this application, and in order to understand the full nature and extent of the technical disclosure of this application, reference must be made to the accompanying drawings and the following detailed description.

5 Claims, 2 Drawing Figures

BALANCED THREE-PLY BIAS TIRE

This invention relates to pneumatic tires and more particularly to a balanced three-ply bias tire.

Heretofore, non-belted, bias-ply tires have generally been constructed with two, four, or more carcass plies. Generally speaking, the number of carcass plies has been an even number to provide a balanced structure although when a large number of carcass plies have been utilized the imbalance effect of an uneven number of carcass plies is normally minimized. The present invention provides a bias-ply tire of a balanced construction with three plies only. In accordance with the present invention, two carcass plies are provided with their cords being of a standard or nominal denier and extending in the same general direction with respect to the tire centerplane and at the same cord angle with respect thereto. A third ply of extra high denier cords is sandwiched between the first two mentioned plies with its cords extending at the same angle as the first two plies but in an opposite direction with respect to the centerplane of the tire.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 1:
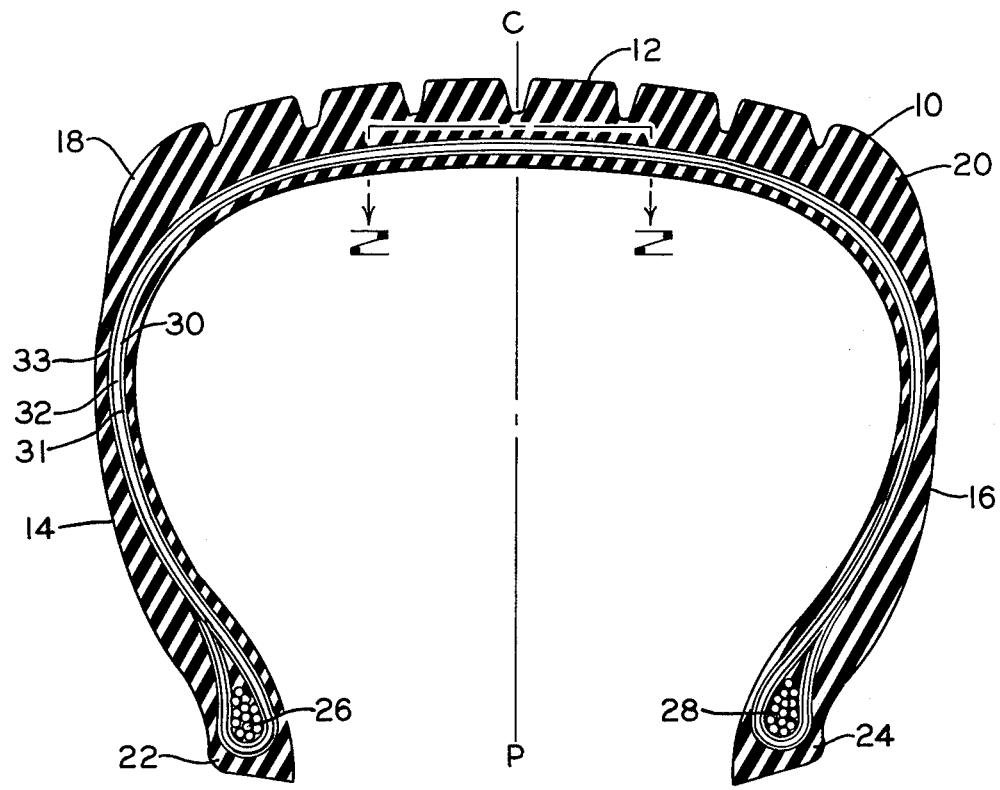
FIG. 1 is a cross-sectional view of a pneumatic tire constructed in accordance with the present invention.

With reference to the drawings, there is illustrated a tire 10 constructed in accordance with the present invention. The tire 10 includes a tread portion 12, a pair of sidewall portions 14 and 16 extending radially inwardly of and from the lateral edges or shoulder portions 18 and 20 of the tread portion 12. Each sidewall portion 14 and 16 terminates at its radially inner extremities in a pair of annular bead portions 22 and 24. The bead portions 22 and 24 contain inextensible annular bead cores 26 and 28, respectively.

In accordance with the present invention, there is provided a carcass reinforcing structure 30 extending circumferentially about the tire 10 and from the bead core 26 to bead core 28. For purposes of the present invention, the carcass structure shall be deemed to include only those reinforcing components of the tire which extend continuously from one bead core 26 to the other bead core 28.

In accordance with the present invention, the carcass structure 30 consists of three plies 31, 32, 33 of continuous tire cord fabric. The radially inner and radially outer plies 31 and 33 are comprised of a plurality of parallel tire cords of a given denier which extend at substantially the same bias angle alpha and in the same direction with respect to the centerplane CP of the tire. The centerplane CP of the tire, for purposes of this invention, is a plane perpendicular to the rotational axis of the tire and disposed midway between the shoulder portions 18 and 20. Alpha for all three plies is between 25° and 40°. The middle carcass ply 32 is made of continuous tire cords having a denier substantially greater that that of the first two carcass plies 31 and 33. The middle ply 32 is sandwiched between the two plies 31 and 33 and has its cords extending at an opposite angular direction with respect to the centerplane CP than those of the two plies 31 and 33.

Figure 2:
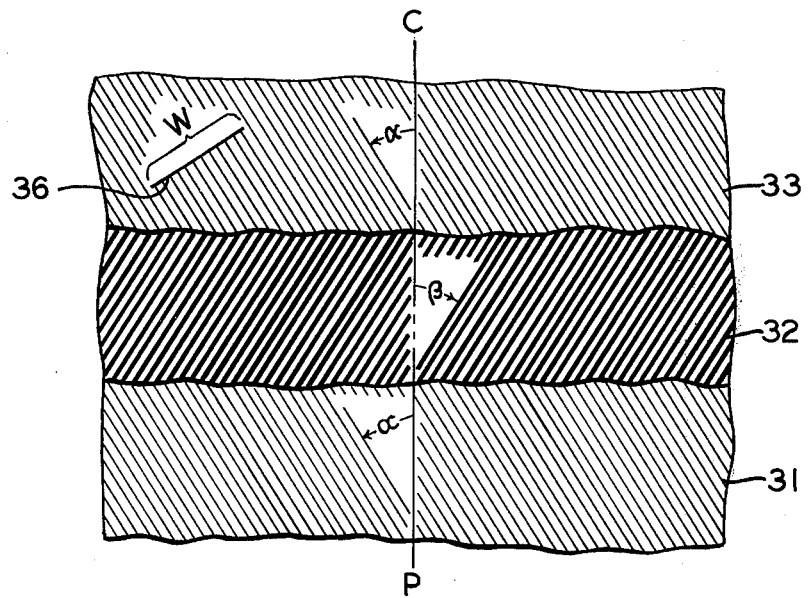
FIG. 2 is a sectional view of the tire of FIG. 1, taken along line 2—2 of FIG. 1 with portions broken away and illustrating the cord size and angular arrangement.

The particular tire illustrated is a left-right-left construction since the radially inner ply when moved toward the rotational axis as in FIG. 2 has its cords extending toward the upper left with respect to the centerplane CP. The next ply 32 has its cords extending to the upper right with respect to the centerplane CP and the last ply 33 has its cords extending to the upper left with respect to the centerplane CP.

In accordance with the present invention, therefore, the single ply having its cords extending in one angular direction with respect to a centerplane is of a greater strength than either of the two plies on opposite sides thereof which have their cords extending at an opposite angular direction with respect to the centerplane CP. The strength of a ply of tire cord fabric is equal to the number of ends per unit of width or end count of the cords in the ply times the strength of each cord. The strength of the cord is the load at break and ends per unit of width are measured across a unit width W of the fabric measured perpendicular to the cords as seen at 36 in FIG. 2.

Thus, the strength of the center ply 32 can be increased by increasing the size of the cords and for the number of cords per unit width. Since it is usually preferably to have a fairly high end count in all plies, it is generally not practical to attempt to provide the desired increase in strength in the center ply 32 by merely increasing the end count over that of the two adjacent plies 31 and 33. It, therefore, becomes preferable to increase the size of the cords rather than the end count. The strength of the sandwiched ply 32 should be at least 25 percent but not more than 75 percent greater than the strength of either of the other two plies 31 and 33. Further, it is desirable that the inner and outer plies 31 and 33 be of equal strength.

In a specific example, a plurality of size H78:15 tires were built in which the first and third plies 31 and 33 were of 1000/2 polyester cord fabric having 30 ends per inch (11.8 ends per centimeter). Each cord had a strength of 32 pounds (14.5 kilograms) and thus the strength of the fabric in the first and third plies 31 and 33 was equal to 30 times 32 pounds (14.5 kilograms) or 960 pounds per inch (171 kilograms per centimeter). The sandwiched ply 32 was of 1000/3 polyester cord fabric having 30 ends per inch (11.8 ends per centimeter). The strength of each 1000/3 polyester cord was 50 pounds (22.6 kilograms) and thus the strength of the sandwiched ply 32 was 1500 pounds per inch (268 kilograms per centimeter). In this particular example, therefore, the strength of the sandwiched ply was 57 percent greater than either of the first and third plies 31 and 33.

The tires were built in a conventional manner for manufacturing bias-ply tires on a cylindrical tire building drum and then brought to the torus shape and cured in a mold. The finished cord angle for all three plies at the centerplane was 33°.

A series of conventional 4-ply bias tires were also built and cured in the same mold. Each ply was of 1000/2 polyester cord fabric having 27 ends per inch (10.6 ends per centimeter). The strength of each cord was 32 pounds (14.5 kilograms) and thus the strength of each ply was 864 pounds per inch (154 kilograms per centimeter). These tires were built in a conventional fashion for manufacturing bias-ply tires brought to the torus form and cured in a tire-curing mold. The cord angle for all four plies of the centerplane was 33°.

The three-ply tires according to the present invention were ride tested against the conventional four-ply tires and no discernible difference in the riding qualities or esthetics was detected.

Further, it was discovered that the three-ply tire in accordance with the present invention did not exhibit any significant ply steer characteristics. Ply steer, as will be appreciated by those skilled in the art, is a phenomenon exhibited by pneumatic tires in which the tire tends to track or pull to one direction as it rolls along a surface due to the angularity of the cordreinforcing structure beneath the tread. If enough plies are provided in the area of the tread and the angles of the successive plies successively alternate in opposite directions with respect to the centerplane, the ply steer problem is minimized. However, in the case of only three plies with two plies having their cords extending in one direction and the third ply having its cord angle extending in the other direction, one would expect the tire to exhibit severe ply steer characteristics.

In order to determine the ply steer characteristics of the present invention, a second series of tires having a right-left-right angular orientation of the plies was constructed. These tires were installed on the left side of a car as viewed by the driver while tires according to the first description having a left-right-left orientation of the cords were installed on the other side of the car. In this fashion, if they were going to exhibit any ply steer characteristics to the tires, it would all be directed in the same sideways direction with respect to the car. The tires were ride tested for on-center feel. There were then switched side for side on the car such that the left-right-left construction tires were on the left side of the car and the right-left-right construction tires were on the right side of the car. They were again ride tested for on-center feel. These results were compared to a set of four-ply bias tires as described previously herein and found to be equal for on-center feel in one case and exhibited only a small reduction in on-center feel in the other case. All were well within commercially acceptable limits.

Thus, it can be seen that the present invention quite surprisingly demonstrates that a three-ply bias tire can be provided which does not exhibit the expected esthetics, handling, and ply steer problems. Such a tire has the advantages of reducing the amount of material required in a pneumatic tire from that in a four-ply tire, as well as eliminating one of four steps in buidling building four-ply carcass structure.

while certain representative embodiments and details have been shown for the purpose of illustrating the invention, it will be apparent to those skilled in the art that various changes and modifications may be made therein without departing from the spirit or scope of the invention.

What is claimed is:

1. A pneumatic tire comprising a ground-contacting tread portion, a pair of sidewalls extending radially inwardly of the axially outer edges of said tread portion and terminating at their radially inner extremities in a pair of annular inextensible bead portions and having a carcass reinforcing structure of continuous cords extending from one bead portion to the other bead portion, said reinforcing carcass structure consisting of three plies of bias tire cord fabric extending at an angle of between 25° and 40° with respect to the centerplane of the tire at the centerplane, said three plies being characterized by two of said plies being comprised of cords of a first denier and extending in the same general direction with respect to said centerplane and a third ply of said three plies being sandwiched between said first two mentioned plies and having cords of substantially greater denier than that of the first two plies and extending in an opposite direction with respect to said centerplane.

2. A tire as claimed in Claim 1, wherein the cord angles of all three plies with respect to said centerplane are the same.

3. A tire as claimed in claim 2, wherein the cords of all three plies are of the same material and the strength of the third ply is between 25 and 75 percent greater than the strength of said two of said plies.

4. A tire as claimed in claim 3, wherein the strength of the third ply is about 50 percent greater than the strength of either of said two of said plies.

5. A tire as claimed in claim 4, wherein said two of said plies are of equal strength.

* * * * *